(12) United States Patent
Peng et al.

(10) Patent No.: US 12,736,718 B2
(45) Date of Patent: Sep. 15, 2026

(54) UNIDIRECTIONAL PERSPECTIVE FILM, SINGLE-SIDED MIRROR AND METHOD FOR PREPARING SAME, AND ELECTRONIC DEVICE

(71) Applicant: BYD COMPANY LIMITED, Shenzhen (CN)

(72) Inventors: Xinhai Peng, Shenzhen (CN); Yuyang Liu, Shenzhen (CN); Jihou Wang, Shenzhen (CN); Chao Li, Shenzhen (CN); Yuan Li, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 304 days.

(21) Appl. No.: 18/398,498

(22) Filed: Dec. 28, 2023

(65) Prior Publication Data

US 2024/0134095 A1 Apr. 25, 2024
US 2024/0230967 A9 Jul. 11, 2024

Related U.S. Application Data

(63) Continuation of application No. PCT/CN2022/114244, filed on Aug. 23, 2022.

(30) Foreign Application Priority Data

Aug. 25, 2021 (CN) ......................... 202110979363.4

(51) Int. Cl.
*G02B 5/08* (2006.01)

(52) U.S. Cl.
CPC ............ *G02B 5/0816* (2013.01); *G02B 5/08* (2013.01); *G02B 5/0858* (2013.01)

(58) Field of Classification Search
CPC ....... G02B 5/0816; G02B 5/08; G02B 5/0858
See application file for complete search history.

(56) References Cited

U.S. PATENT DOCUMENTS

2012/0293868 A1 11/2012 Wang et al.
2014/0227500 A1* 8/2014 Vikor .................. G02B 5/0833 428/216

FOREIGN PATENT DOCUMENTS

CN 201000489 Y 1/2008
CN 102730984 A 10/2012
CN 203606527 U 5/2014
CN 203994928 U 12/2014
CN 204451388 U 7/2015
CN 204451390 U 7/2015
CN 105068170 A 11/2015
CN 106396425 A 2/2017
CN 106431003 A 2/2017
(Continued)

OTHER PUBLICATIONS

International Search Report and Written Opinion for Application No. PCT/CN2022/114244, mailed on Nov. 1, 2022, 9 pages.
(Continued)

*Primary Examiner* — Phu Vu
(74) *Attorney, Agent, or Firm* — Sheppard Mullin Richter & Hampton LLP

(57) ABSTRACT

A unidirectional perspective film includes a first niobium oxide layer, a first silicon oxide layer, an absorption layer, a second niobium oxide layer, and a second silicon oxide layer that are sequentially disposed. The absorption layer has a thickness ranging from 8 nm to 20 nm.

18 Claims, 5 Drawing Sheets

(56) References Cited

FOREIGN PATENT DOCUMENTS

| | | | |
|---|---|---|---|
| CN | 206129005 | U | 4/2017 |
| CN | 106827742 | A | 6/2017 |
| CN | 206467149 | U | 9/2017 |
| CN | 212400492 | U | 1/2021 |
| CN | 113050205 | A | 6/2021 |
| DE | 202006015876 | U1 | 2/2008 |
| EP | 3047314 | B1 | 2/2019 |
| JP | H08-262481 | A | 10/1996 |
| JP | H09-262481 | A | 10/1997 |
| JP | 2004-126530 | A | 4/2004 |
| JP | 2005-283748 | A | 10/2005 |
| JP | 2014-527641 | A | 10/2014 |
| JP | 2014231199 | A | 12/2014 |
| JP | 2016530580 | A | 9/2016 |
| JP | 2019-133078 | A | 8/2019 |
| WO | 00/31571 | A1 | 6/2000 |
| WO | 2008/132921 | A1 | 11/2008 |
| WO | 2015/042157 | A1 | 3/2015 |
| WO | 2017/090218 | A1 | 6/2017 |

OTHER PUBLICATIONS

Decision of Refusal dated Dec. 23, 2025, issued in Japanese Patent Application No. 2023-580877, with English machine translation (5 pages).
Notice of Reasons for Refusal dated Jun. 17, 2025, issued in Japanese Patent Application No. 2023-580877, with English machine translation (7 pages).
First Office Action and Search Report dated Aug. 6, 2024, issued in Chinese Patent Application No. 202110979363.4, with English machine translation (16 pages).
Request for the Submission of an Opinion dated Aug. 4, 2025, issued in Korean Patent Application No. 10-2023-7045417, with English machine translation (9 pages).
Extended European Search Report dated Sep. 9, 2024, issued in European Patent Application No. 22860491.4 (7 pages).
Examination Report No. 1 dated Oct. 31, 2024, issued in Australian Patent Application No. 2022333104 (4 pages).
Examination Report No. 2 dated Sep. 10, 2025, issued in Australian Patent Application No. 2022333104 (5 pages).
Examination Report No. 3 dated Oct. 28, 2025, issued in Australian Patent Application No. 2022333104 (4 pages).

* cited by examiner

UNIDIRECTIONAL PERSPECTIVE FILM, SINGLE-SIDED MIRROR AND METHOD FOR PREPARING SAME, AND ELECTRONIC DEVICE

CROSS-REFERENCE TO RELATED APPLICATIONS

This application is a Continuation Application of International Patent Application No. PCT/CN2022/114244, filed on Aug. 23, 2022, which is based on and claims priority to and benefits of Chinese Patent Application No. 202110979363.4, filed on Aug. 25, 2021. The entire content of all of the above-referenced application is incorporated herein by reference.

FIELD

The present disclosure relates to the technical field of optics, and more particularly, to a unidirectional perspective film, a single-sided mirror and a method for preparing the same, and an electronic device.

BACKGROUND

A single-sided mirror is a type of special coated glass, where a side (outer side) is a glass mirror, which can reflect light, has a function similar to that of an ordinary mirror, and has a mirror effect. And another side (inner side) has a perspective effect, that is, the scene at the inner side of the glass mirror cannot be seen from the outer side of the glass mirror, but the scene at the outer side of the glass mirror can be seen from the inner side of the glass mirror. The single-sided mirror is applicable to sites such as prisons, interrogation rooms of public security bureaus, procuratorates, courts, psychiatric hospitals, research laboratories of university research organizations, and large conference rooms.

For a single-sided mirror on the current market, silver, titanium, or titanium oxide is mostly used as a plating to form a single-sided perspective effect. However, the foregoing materials are not only expensive, but also poor in stability. As a result, a coating film is prone to fail. Additionally, the existing single-sided mirror is not diverse in color, and does not meet diverse application requirements. Therefore, it is necessary to provide a novel unidirectional perspective film, to improve the stability of the single-sided mirror and enable the single-sided mirror to have diverse colors.

SUMMARY

In view of this, the present disclosure provides a unidirectional perspective film. The unidirectional perspective film is low in production cost and stable in performance, and has a good single-sided perspective effect. In addition, the unidirectional perspective film is available in many different colors, and meets market requirements. The present disclosure further provides a single-sided mirror and a method for preparing the same, and an electronic device.

According to a first aspect of the present disclosure, a unidirectional perspective film is provided, including a first niobium oxide layer, a first silicon oxide layer, an absorption layer, a second niobium oxide layer, and a second silicon oxide layer that are sequentially arranged. The absorption layer has a thickness ranging from about 8 nm to about 20 nm.

According to an embodiment of the present disclosure, the absorption layer includes one or more of silicon, indium, niobium, titanium, and chromium.

According to an embodiment of the present disclosure, each of the first niobium oxide layer and the second niobium oxide layer has a thickness ranging from about 10 nm to about 120 nm.

According to an embodiment of the present disclosure, each of the first silicon oxide layer and the second silicon oxide layer has a thickness ranging from about 10 nm to about 160 nm.

According to an embodiment of the present disclosure, the first niobium oxide layer has a thickness ranging from about 30 nm to about 60 nm.

According to an embodiment of the present disclosure, the first silicon oxide layer has a thickness ranging from about 90 nm to about 110 nm.

According to an embodiment of the present disclosure, the second niobium oxide layer has a thickness ranging from about 60 nm to about 110 nm.

According to an embodiment of the present disclosure, the second silicon oxide layer has a thickness ranging from about 50 nm to about 90 nm.

According to an embodiment of the present disclosure, the unidirectional perspective film has a visible light transmission rate ranging from about 10% to about 25%.

According to an embodiment of the present disclosure, an absolute value of a difference between visible light reflection rates of two side surfaces of the unidirectional perspective film is greater than or equal to 15%.

According to the unidirectional perspective film of the present disclosure, the first niobium oxide layer and the first silicon oxide layer form a reflection-enhancing layer, so that a surface ($R_1$ face) of the unidirectional perspective film close to a side of the first niobium oxide layer has a high reflection rate, to form a mirror face effect; and the second niobium oxide layer and the second silicon oxide layer form a reflection-reducing layer, so that a surface ($R_2$ face) of the unidirectional perspective film close to a side of the second silicon oxide layer has a low reflection rate, to form a perspective effect. The absorption layer can absorb part of light. When the absorption layer has a thickness ranging from about 8 nm to about 20 nm, it can be ensured that the $R_2$ face cannot be seen from the $R_1$ face and the $R_1$ face can be seen from the $R_2$ face.

According to a second aspect, the present disclosure provides a single-sided mirror, including a substrate and the unidirectional perspective film according to the first aspect of the present disclosure disposed on a surface of the substrate.

According to an embodiment of the present disclosure, surface of the substrate is disposed closer to the first niobium oxide layer than to the first silicon oxide layer.

According to an embodiment of the present disclosure, the substrate includes a transparent substrate. The transparent substrate includes one or more of glass, an acrylic plate, an anti-explosion film, a release film, and polyethylene terephthalate (PET).

The single-sided mirror provided in the second aspect of the present disclosure has a good unidirectional perspective effect, is low cost and available in different colors, and is widely applicable to many fields.

According to a third aspect, the present disclosure provides a method for preparing a single-sided mirror, including:

providing a substrate, and depositing a first niobium oxide layer, a first silicon oxide layer, an absorption layer, a second niobium oxide layer, and a second silicon oxide layer sequentially on a surface of the substrate to obtain the single-sided mirror. The absorption layer includes one or more of silicon, indium, niobium, titanium, and chromium; the absorption layer has a thickness ranging from about 8 nm to about 20 nm.

According to a fourth aspect, the present disclosure provides an electronic device, including the unidirectional perspective film according to the first aspect of the present disclosure or the single-sided mirror according to the second aspect of the present disclosure.

DETAILED DESCRIPTION

The following clearly and completely describes the technical solutions in the embodiments of the present disclosure with reference to the accompanying drawings in the embodiments of the present disclosure. Apparently, the described embodiments are only some of the embodiments of the present disclosure rather than all of the embodiments. All other embodiments obtained by a person of ordinary skill in the art based on the embodiments of the present disclosure without creative efforts shall fall within the protection scope of the present disclosure.

Figure 1:
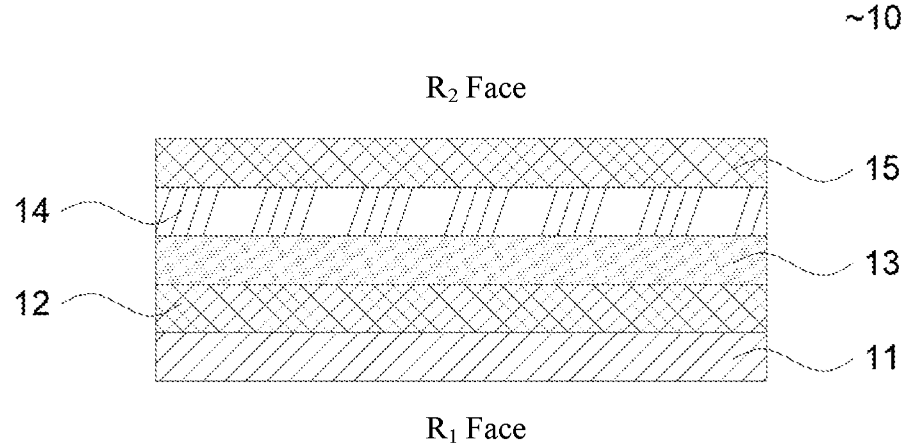
FIG. 1 is a schematic diagram of a structure of a unidirectional perspective film according to an embodiment of the present disclosure.

Refer to FIG. 1. FIG. 1 is a schematic diagram of a structure of a unidirectional perspective film according to an embodiment of the present disclosure. The unidirectional perspective film includes a first niobium oxide layer 11, a first silicon oxide layer 12, an absorption layer 13, a second niobium oxide layer 14, and a second silicon oxide layer 15 that are sequentially arranged. For ease of description, in the present disclosure, an outer side of the unidirectional perspective film refers to a side of the first niobium oxide layer 11; and an inner side of the unidirectional perspective film refers to a side of the second silicon oxide layer 15.

In the present disclosure, an outer side surface ($R_1$ face) of the unidirectional perspective film is the first niobium oxide layer, and no half-wave loss is generated when light from the outer side face passes through the first niobium oxide layer to the first silicon oxide layer, so that reflection of the light is enhanced, and the outer side of the unidirectional perspective film presents a mirror face effect; and an inner side surface ($R_2$ face) of the unidirectional perspective film is the second silicon oxide layer, and half-wave loss is generated when light from the inner side face passes through the second silicon oxide layer to the second niobium oxide layer, so that reflection of the light is reduced, and the inner side of the unidirectional perspective film presents a perspective effect. In the present disclosure, the unidirectional perspective film is prepared from niobium oxide and silicon oxide, which greatly reduces production costs and facilitates product efficiency.

In the unidirectional perspective film of the present disclosure, the absorption layer may absorb part of light, so that the unidirectional perspective film has a transmission rate falling within a proper range. In an implementation of the present disclosure, the absorption layer includes one or more of silicon, indium, niobium, titanium, and chromium. In an implementation of the present disclosure, the absorption layer has a thickness ranging from about 8 nm to about 20 nm. Further, the absorption layer has a thickness ranging from about 15 nm to about 20 nm. The thickness of the absorption layer may be, but is not limited to, 8 nm, 10 nm, 12 nm, 15 nm, 17 nm, or 20 nm. A large thickness of the absorption layer results in a large light absorption amount and a small transmission rate of the unidirectional perspective film. A small thickness of the absorption layer results in a small light absorption amount and a large transmission rate of the unidirectional perspective film. When the thickness of the absorption layer ranges from 8 nm to 20 nm, the absorption layer can well collaborate with the first niobium oxide layer, the first silicon oxide layer, the second niobium oxide layer, and the second silicon oxide layer, to ensure that the outer side of the unidirectional perspective film presents the mirror face effect and the inner side of the unidirectional perspective film presents the perspective effect. In an implementation of the present disclosure, the unidirectional perspective film has a visible light transmission rate ranging from about 10% to about 25%. The visible light transmission rate of the unidirectional perspective film may be, but is not limited to, 10%, 15%, 18%, 20%, 22%, or 25%.

In an implementation of the present disclosure, each of the first niobium oxide layer and the second niobium oxide layer has a thickness ranging from about 10 nm to about 120 nm. The thickness of each of the first niobium oxide layer and the second niobium oxide layer may be, but is not limited to, 10 nm, 30 nm, 40 nm, 50 nm, 55 nm, 60 nm, 80 nm, 90 nm, 100 nm, or 120 nm. In an implementation of the present disclosure, each of the first silicon oxide layer and the second silicon oxide layer has a thickness ranging from about 10 nm to about 160 nm. The thickness of each of the first silicon oxide layer and the second silicon oxide layer may be, but is not limited to, 10 nm, 30 nm, 50 nm, 70 nm, 80 nm, 90 nm, 100 nm, 110 nm, 120 nm, or 160 nm. When the thicknesses of the first niobium oxide layer and, the second niobium oxide layer, the first silicon oxide layer, and the second silicon oxide layer are controlled to fall within the foregoing ranges, it can be ensured that the unidirectional perspective film has good structural stability and is not prone to fall off. In addition, preparation costs of the unidirectional perspective film are low, to increase product marketability.

Figure 2:
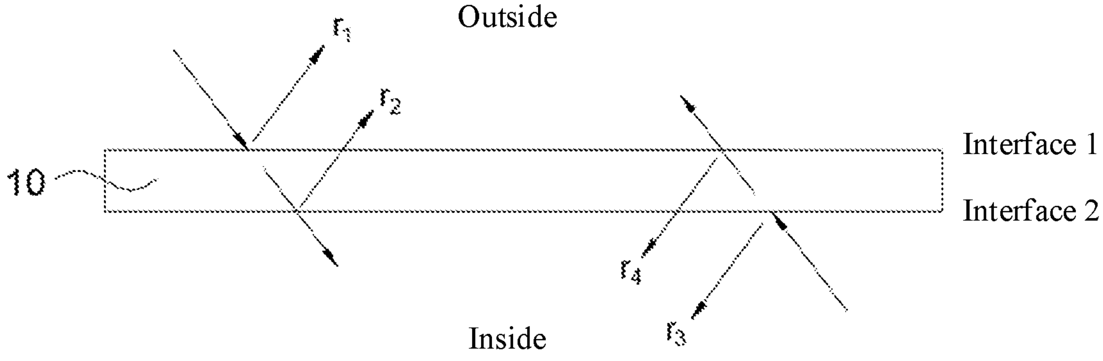
FIG. 2 is a schematic diagram of optical effects in a unidirectional perspective film according to an embodiment of the present disclosure.

In the present disclosure, by adjusting the thicknesses of the first niobium oxide layer, the first silicon oxide layer, the second niobium oxide layer, and the second silicon oxide layer, the unidirectional perspective effect of the unidirectional perspective film can be optimized, the reflection rate of the outer side of the unidirectional perspective film can be enhanced, and the reflection rate of the inner side of the unidirectional perspective film can be reduced, to achieve a good visual contrast effect with a side being a mirror face and another side being a perspective face. FIG. 2 is a schematic diagram of optical effects in a unidirectional perspective film according to an embodiment of the present disclosure, where $r_1$ is an amplitude reflection coefficient of outside light generated on an interface 1, $r_2$ is an amplitude reflection coefficient of outside light generated on an interface 2, $r_3$ is an amplitude reflection coefficient of inside light generated on the interface 2, and $r_4$ is an amplitude reflection coefficient of inside light generated on the interface 1. The reflection rate of the unidirectional perspective film on the interface 1 is $R_1$, and the reflection rate of the unidirectional perspective film on the interface 2 is $R_2$, where $R_1=|r_1-r_2|$ and $R_2=|r_3-r_4|$. Further, $r_1=(N_0-N_1)/(N_0+N_1)$, $r_2=(N_1-N_2)/(N_1+N_2)*e(-2\delta)$, $r_3=(N_0-N_2)/(N_0+N_2)$, $r_4=(N_2-N_1)/(N_1+N_2)*e(-2\delta)$, and $\delta=2\pi*N*D/\lambda$, where $N_0$ represents a refractive index of an incident medium, $N_1$ represents a refractive index of silicon dioxide, $N_2$ represents a refractive index of niobium oxide, $\delta$ represents a phase film thickness of the unidirectional perspective film, D represents a physical film thickness of the unidirectional perspective film, and $\lambda$ represents a wavelength of light. In addition, when an optical path difference of the light between layers of interfaces is an even multiple of a quarter wavelength, reflection of the light may be enhanced; or when an optical path difference of the light between layers of interfaces is an odd multiple of a quarter wavelength, reflection of the light may be reduced.

According to the foregoing formulas and principles, a thickness relationship of the optimized unidirectional perspective film is deduced in the present disclosure. When the first niobium oxide layer has a thickness ranging from about 30 nm to about 60 nm and the first silicon oxide layer has a thickness ranging from about 90 nm to about 110 nm, the outer side face of the unidirectional perspective film may have a high reflection rate; and when the second niobium oxide layer has a thickness ranging from about 60 nm to about 110 nm and the second silicon oxide layer has a thickness ranging from about 50 nm to about 90 nm, the inner side face of the unidirectional perspective film may have a low reflection rate. Further, a ratio of the thickness of the first niobium oxide layer to that of the first silicon oxide layer is 1:(1.5 to 3.5), and a ratio of the thickness of the second niobium oxide layer to that of the second silicon oxide layer is 1:(0.5 to 1.5). The ratio of the thickness of the first niobium oxide layer to that of the first silicon oxide layer may be, but is not limited to, 1:1.5, 1:2, 1:2.5, or 1:3.5, and the ratio of the thickness of the second niobium oxide layer to that of the second silicon oxide layer may be, but is not limited to, 1:0.5, 1:0.7, 1:1, or 1:1.5. In an implementation of the present disclosure, an absolute value of a difference between visible light reflection rates of two side surfaces of the unidirectional perspective film is greater than or equal to 15%. The absolute value of the difference between the visible light reflection rates of the two side surfaces of the unidirectional perspective film may be, but is not limited to, 15%, 20%, 25%, 30%, 35%, or 40%. A larger difference between the visible light reflection rates of the two side surfaces of the unidirectional perspective film indicates a better single-sided perspective effect and a more significant visual difference.

In the present disclosure, the thickness relationship between the layers of the unidirectional perspective film also affects the color of the film. In an embodiment, by adjusting the thicknesses of the layers, the reflection rate of the unidirectional perspective film for the visible light can be changed. Because the unidirectional perspective film has different reflection rates for light in different wavebands, the unidirectional perspective film can present different colors.

Figure 3:
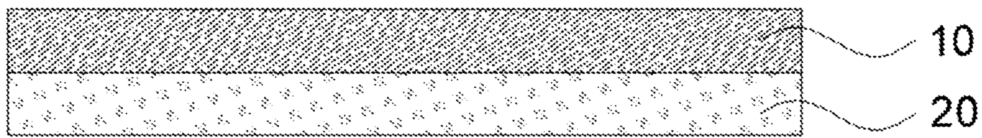
FIG. 3 is a schematic diagram of a structure of a single-sided mirror according to an embodiment of the present disclosure.

The present disclosure further provides a single-sided mirror. FIG. 3 is a schematic diagram of a structure of a single-sided mirror according to an embodiment of the present disclosure, where the single-sided mirror includes a substrate 20 and a unidirectional perspective film 10 disposed on a surface of the substrate. In an implementation of the present disclosure, the substrate includes a transparent substrate. In some implementations of the present disclosure, the substrate includes one or more of glass and a polymeric transparent substrate, where the polymeric transparent substrate includes one or more of polyethylene terephthalate (PET), an acrylic plate, an anti-explosion film, and a release film. In the present disclosure, the unidirectional perspective film may be disposed on any surface of the substrate. In some implementations of the present disclosure, the substrate is disposed on an outer side ($R_1$ face) of the unidirectional perspective film, that is, the substrate is adjacent to the first niobium oxide layer in the unidirectional perspective film, and the foregoing position arrangement can ensure that the single-sided mirror has a good single-sided perspective effect.

The present disclosure further provides a method for preparing a single-sided mirror, including the following steps:

A substrate is provided, and a first niobium oxide layer, a first silicon oxide layer, an absorption layer, a second niobium oxide layer, and a second silicon oxide layer are deposited sequentially on a surface of the substrate to obtain the single-sided mirror.

In an implementation of the present disclosure, the first niobium oxide layer, the first silicon oxide layer, the absorption layer, the second niobium oxide layer, and the second silicon oxide layer are prepared using a sputtering method. In an embodiment, for the first niobium oxide layer and the second niobium oxide layer, argon and oxygen are fed into a sputtering machine, a niobium target is bombarded through the argon, sputtered niobium reacts with the oxygen to form niobium oxide, and the niobium oxide is deposited on the substrate to form niobium oxide layers. For the first silicon oxide layer and the second silicon oxide layer, argon and oxygen are fed into the sputtering machine, a silicon target is bombarded through the argon, sputtered silicon reacts with the oxygen to form silicon oxide, and the silicon oxide is deposited to form silicon oxide layers.

In the present disclosure, the absorption layer includes one or more of silicon, indium, niobium, titanium, and chromium. The absorption layer is prepared by bombarding a corresponding target material through argon. For example, when the absorption layer is a silicon layer, the silicon layer is obtained by bombarding a silicon target through argon and depositing silicon simultaneously.

In some implementations of the present disclosure, a method for preparing a single-sided mirror is as follows:

A substrate is provided, the substrate placed in a sputtering machine, and a platform furnace chamber is vacuumized.

Argon is fed into the platform furnace chamber, an ion source is opened after the gas is stable, and ion cleaning is performed on surfaces of the substrate and a target material, where ICP power of the ion source ranges from 0.5 kw to 5 kw, a vacuum degree of the platform furnace chamber ranges from $1\times10^{-3}$ to $1\times10^{-2}$ Pa, and an ion cleaning time ranges from 1 min to 60 min.

Argon is continuously fed, and oxygen starts to be fed, where a flow rate of the oxygen ranges from 200 sccm to 300 sccm; a sputtering power supply of a niobium target is started, where sputtering power ranges from 5 kw to 15 kw and a working pressure of a coating film ranges from 0.07 Pa to 1 Pa; and a first niobium oxide layer is deposited on the surface of the substrate, where the first niobium oxide layer has a thickness ranging from about 10 nm to about 120 nm.

The sputtering power supply of the niobium target is turned off, argon and oxygen are continuously fed, and a sputtering power supply of a silicon target is turned on, where sputtering power ranges from 5 kw to 15 kw and a working pressure of a coating film ranges from 0.07 Pa to 1 Pa; and a first silicon oxide layer is deposited on a surface of the first niobium oxide layer, where the first silicon oxide layer has a thickness ranging from about 10 nm to about 160 nm.

Oxygen is stopped, and a sputtering power supply of a target material at an absorption layer is turned on, where sputtering power ranges from 5 kw to 15 kw and a working pressure of a coating film ranges from 0.07 Pa to 1 Pa; and the absorption layer is deposited on a surface of the first silicon oxide layer, where the absorption layer has a thickness ranging from about 8 nm to about 20 nm.

Argon is continuously fed, and oxygen begins to be fed, where a flow rate of the oxygen ranges from 200 sccm to 300 sccm; a sputtering power supply of a niobium target is started, where sputtering power ranges from 5 kw to 15 kw and a working pressure of a coating film ranges from 0.07 Pa to 1 Pa; and a second niobium oxide layer is deposited on the surface of the substrate, where the second niobium oxide layer has a thickness ranging from about 10 nm to about 120 nm.

The sputtering power supply of the niobium target is turned off, argon and oxygen are continuously fed, and a sputtering power supply of a silicon target is turned on, where sputtering power ranges from 5 kw to 15 kw and a working pressure of a coating film ranges from 0.07 Pa to 1 Pa; and a second silicon oxide layer is deposited on a surface of the second niobium oxide layer, where the second silicon oxide layer has a thickness ranging from about 10 nm to about 160 nm. Then, an atomic mirror is obtained.

The method for preparing an atomic mirror provided in the present disclosure is simple in process and high in production efficiency, and the prepared atomic mirror has high structural stability and has a good single-sided perspective effect.

The present disclosure further provides an electronic device, including the unidirectional perspective film or the single-sided mirror according to the present disclosure. In some embodiments of the present disclosure, the electronic device includes a housing, and the housing includes a housing substrate and a unidirectional perspective film, where the housing substrate can provide an arrangement position and support for another structure of the electronic device, and the housing substrate may be a glass substrate or a polymeric transparent substrate. The unidirectional perspective film is disposed on a surface of the housing substrate, and a side of the unidirectional perspective film whose reflection rate is high is used as an appearance face of the housing toward the outside of the housing. Because light outside the housing is strong and the appearance face of the housing has a high reflection rate, a mirror face effect is presented on the appearance face of the housing, thereby blocking a product structure inside the housing. Further, a light-emitting source may be disposed inside the housing, the light-emitting source may be an LED lamp or an organic light-emitting material, and by designing a shape of the light-emitting source and a color of emitted light, a specific pattern such as a product logo or a decorative motif may be formed. The single-sided mirror has a specific transmission rate. Therefore, when a light source inside the housing is sufficiently strong, a pattern inside the housing can also be seen from the outside of the housing, but an area where no light is emitted inside the housing is still invisible, that is, a light-emitting pattern inside the housing can be seen from the appearance face of the housing, but the area where no light is emitted inside the housing is still a mirror face, thereby achieving a magic decorative effect.

In some other embodiments of the present disclosure, the electronic device includes a display screen assembly, the display screen assembly includes a display panel and a unidirectional perspective film, and the unidirectional perspective film is disposed on a surface of the display panel. A side of the unidirectional perspective film whose reflection rate is high faces the outside of the display screen assembly. When the display screen assembly is off, the display screen assembly presents a mirror face effect; and when the display screen assembly is on, pictures of the display screen assembly can be normally displayed. In an embodiment, when the display screen assembly does not emit light (off), light on the outer side of the unidirectional perspective film is brighter, so that reflection of the light is strong, and the surface of the display screen assembly has a mirror face effect; and when the display screen assembly emits light (on), light on the inner side of the unidirectional perspective film is brighter, so that light transmitted from the display screen assembly has high intensity, and content displayed by the display screen assembly can be seen from the outside of the display screen assembly, thereby implementing normal display when the display screen assembly is on, and achieving a decorative effect of a mirror face when the display screen assembly is off.

In an implementation of the present disclosure, the electronic device may be a mobile phone, a computer, an e-cigarette, a smart band, a wearable device, or the like.

The technical solutions of the present disclosure are further described below with example embodiments.

Embodiment 1

A method for preparing a single-sided mirror includes the following operations.

A glass substrate is provided, where the glass substrate has a thickness of 3 mm, and the glass substrate is ultrasonically cleaned using ethanol, then rinsed using deionized water, and dried in a vacuum environment.

The glass substrate is placed on a workpiece turret of a sputtering machine, and a platform is vacuumized, to enable a pressure in a working chamber to be lower than 0.003 Pa.

An ion source is opened, and argon is fed, where the argon has a flow rate of 280 sccm; and ion cleaning is performed on a surface of the glass substrate, where ICP power of the ion source is 0.7 kw, a vacuum degree is 0.8 Pa, and an ion cleaning time is 5 min.

Argon is continuously fed, oxygen starts to be fed, and a sputtering power supply of a niobium target is turned on, where power of the sputtering power supply is 8 kw; and a first niobium oxide layer is deposited on the surface of the glass substrate, where a working pressure of a coating film is 0.43 Pa, a coating time is 186 s, and the first niobium oxide layer has a thickness of 56 nm.

The niobium target is turned off, a gas source continuously supplies gas, and a sputtering power supply of a silicon target is turned on, where power of the sputtering power supply is 8 kw; and a first silicon oxide layer is deposited on a surface of the first niobium oxide layer, where a working pressure of a coating film is 0.43 Pa, a coating time is 327 s, and the first silicon oxide layer has a thickness of 105 nm.

Oxygen is turned off, and the silicon target is continuously turned on, where power of a sputtering power supply is 8 kw; and a silicon layer deposited on a surface of the first silicon oxide layer, where a working pressure of a coating film is 0.26 Pa, a coating time is 182 s, and the silicon layer has a thickness of 18 nm.

The sputtering power supply of the silicon target is turned off, oxygen is fed, and a sputtering power supply of a niobium target is turned on, where power of the sputtering power supply is 8 kw; and a second niobium oxide layer is deposited on a surface of the silicon layer, where a working pressure of a coating film is 0.43 Pa, a coating time is 340 s, and the second niobium oxide layer has a thickness of 102 nm.

The niobium target is turned off, the gas source continuously supplies gas, the sputtering power supply of the silicon target is turned on, where the power of the sputtering power supply is 8 kw; a second silicon oxide layer is deposited on a surface of the second niobium oxide layer, where a working pressure of a coating film is 0.43 Pa, a coating time is 183 s, and the second silicon oxide layer has a thickness of 55 nm; and a unidirectional perspective film is formed, and a single-sided mirror is obtained, where a structure of the single-sided mirror is substrate/$Nb_2O_5$ (56 nm)/$SiO_2$ (105 nm)/Si (18 nm)/$Nb_2O_5$ (102 nm)/$SiO_2$ (55 nm).

Embodiment 2

A method for preparing a single-sided mirror includes the following operations.

A glass substrate is provided, where the glass substrate has a thickness of 3 mm, and the glass substrate is ultrasonically cleaned using ethanol, then rinsed using deionized water, and dried in a vacuum environment.

The glass substrate is placed on a workpiece turret of a sputtering machine, and a platform is vacuumized, to enable a pressure in a working chamber to be lower than 0.003 Pa.

An ion source is opened, and argon is fed, where the argon has a flow rate of 280 sccm; and ion cleaning is performed on a surface of the glass substrate, where ICP power of the ion source is 0.7 kw, a vacuum degree is 0.8 Pa, and time is 5 min.

Argon is continuously fed, oxygen starts to be fed, and a sputtering power supply of a niobium target is turned on, where power of the sputtering power supply is 8 kw; and a first niobium oxide layer is deposited on the surface of the glass substrate, where a working pressure of a coating film is 0.45 Pa, a coating time is 106 s, and the first niobium oxide layer has a thickness of 32 nm.

The niobium target is turned off, a gas source continuously supplies gas, and a sputtering power supply of a silicon target is turned on, where power of the sputtering power supply is 8 kw; and a first silicon oxide layer is deposited on a surface of the first niobium oxide layer, where a working pressure of a coating film is 0.45 Pa, a coating time is 316 s, and the first silicon oxide layer has a thickness of 95 nm.

Oxygen is turned off, and an indium target is turned on, where power of a sputtering power supply is 8 kw; and an indium layer deposited on a surface of the first silicon oxide layer, where a working pressure of a coating film is 0.25 Pa, a coating time is 180 s, and the indium layer has a thickness of 18 nm.

The sputtering power supply of the indium target is turned off, oxygen is fed, and a sputtering power supply of a niobium target is turned on, where power of the sputtering power supply is 8 kw; and a second niobium oxide layer is deposited on a surface of the indium layer, where a working pressure of a coating film is 0.45 Pa, a coating time is 206 s, and the second niobium oxide layer has a thickness of 62 nm.

The niobium target is turned off, the gas source continuously supplies gas, the sputtering power supply of the silicon target is turned on, where the power of the sputtering power supply is 8 kw; a second silicon oxide layer is deposited on a surface of the second niobium oxide layer, where a working pressure of a coating film is 0.45 Pa, a coating time is 286 s, and the second silicon oxide layer has a thickness of 86 nm; and a unidirectional perspective film is formed, and a single-sided mirror is obtained, where a structure of the single-sided mirror is substrate/$Nb_2O_5$ (32 nm)/$SiO_2$ (95 nm)/In (18 nm)/$Nb_2O_5$ (62 nm)/$SiO_2$ (86 nm).

Embodiment 3

A method for preparing a single-sided mirror includes the following operations.

A glass substrate is provided, where the glass substrate has a thickness of 3 mm, and the glass substrate is ultrasonically cleaned using ethanol, then rinsed using deionized water, and dried in a vacuum environment.

The glass substrate is placed on a workpiece turret of a sputtering machine, and a platform is vacuumized, to enable a pressure in a working chamber to be lower than 0.003 Pa.

An ion source is opened, and argon is fed, where the argon has a flow rate of 280 sccm; and ion cleaning is performed on a surface of the glass substrate, where ICP power of the ion source is 0.7 kw, a vacuum degree is 0.8 Pa, and time is 5 min.

Argon is continuously fed, oxygen starts to be fed, and a sputtering power supply of a niobium target is turned on, where power of the sputtering power supply is 8 kw; and a first niobium oxide layer is deposited on the surface of the glass substrate, where a working pressure of a coating film is 0.45 Pa, a coating time is 127 s, and the first niobium oxide layer has a thickness of 38 nm.

The niobium target is turned off, a gas source continuously supplies gas, and a sputtering power supply of a silicon target is turned on, where power of the sputtering power supply is 8 kw; and a first silicon oxide layer is deposited on a surface of the first niobium oxide layer, where a working pressure of a coating film is 0.45 Pa, a coating time is 326 s, and the first silicon oxide layer has a thickness of 98 nm.

Oxygen is turned off, and the niobium target is turned on, where power of a sputtering power supply is 5 kw; and a niobium layer deposited on a surface of the first silicon oxide layer, where a working pressure of a coating film is 0.45 Pa, a coating time is 180 s, and the niobium layer has a thickness of 18 nm.

The sputtering power supply of the niobium target is turned off, oxygen is fed, and the sputtering power supply of the niobium target is turned on, where power of the sputtering power supply is 8 kw; and a second niobium oxide layer is deposited on a surface of the niobium layer, where a working pressure of a coating film is 0.45 Pa, a coating time is 217 s, and the second niobium oxide layer has a thickness of 65 nm.

The niobium target is turned off, the gas source continuously supplies gas, the sputtering power supply of the silicon target is turned on, where the power of the sputtering power supply is 8 kw; a second silicon oxide layer is deposited on a surface of the second niobium oxide layer, where a working pressure of a coating film is 0.45 Pa, a coating time is 206 s, and the second silicon oxide layer has a thickness of 62 nm; and a unidirectional perspective film is formed, and a single-sided mirror is obtained, where a structure of the single-sided mirror is substrate/$Nb_2O_5$ (38 nm)/$SiO_2$ (98 nm)/Nb (18 nm)/$Nb_2O_5$ (65 nm)/$SiO_2$ (62 nm).

Embodiment 4

A method for preparing a single-sided mirror includes the following operations.

A glass substrate is provided, where the glass substrate has a thickness of 3 mm, and the glass substrate is ultrasonically cleaned using ethanol, then rinsed using deionized water, and dried in a vacuum environment.

The glass substrate is placed on a workpiece turret of a sputtering machine, and a platform is vacuumized, to enable a pressure in a working chamber to be lower than 0.003 Pa.

An ion source is opened, and argon is fed, where the argon has a flow rate of 280 sccm; and ion cleaning is performed on a surface of the glass substrate, where ICP power of the ion source is 0.7 kw, a vacuum degree is 0.8 Pa, and time is 5 min.

Argon is continuously fed, oxygen starts to be fed, and a sputtering power supply of a niobium target is turned on, where power of the sputtering power supply is 8 kw; and a first niobium oxide layer is deposited on the surface of the glass substrate, where a working pressure of a coating film is 0.45 Pa, a coating time is 140 s, and the first niobium oxide layer has a thickness of 42 nm.

The niobium target is turned off, a gas source continuously supplies gas, and a sputtering power supply of a silicon target is turned on, where power of the sputtering power supply is 8 kw; and a first silicon oxide layer is deposited on a surface of the first niobium oxide layer, where a working pressure of a coating film is 0.45 Pa, a coating time is 340 s, and the first silicon oxide layer has a thickness of 102 nm.

Oxygen is turned off, and the niobium target is turned on, where power of a sputtering power supply is 5 kw; and a niobium layer deposited on a surface of the first silicon oxide layer, where a working pressure of a coating film is 0.45 Pa, a coating time is 180 s, and the niobium layer has a thickness of 18 nm.

The sputtering power supply of the niobium target is turned off, oxygen is fed, and the sputtering power supply of the niobium target is turned on, where power of the sputtering power supply is 8 kw; and a second niobium oxide layer is deposited on a surface of the niobium layer, where a working pressure of a coating film is 0.45 Pa, a coating time is 233 s, and the second niobium oxide layer has a thickness of 70 nm.

The niobium target is turned off, the gas source continuously supplies gas, the sputtering power supply of the silicon target is turned on, where the power of the sputtering power supply is 8 kw; a second silicon oxide layer is deposited on a surface of the second niobium oxide layer, where a working pressure of a coating film is 0.45 Pa, a coating time is 233 s, and the second silicon oxide layer has a thickness of 70 nm; and a unidirectional perspective film is formed, and a single-sided mirror is obtained, where a structure of the single-sided mirror is substrate/$Nb_2O_5$ (42 nm)/$SiO_2$ (102 nm)/Nb (18 nm)/$Nb_2O_5$ (70 nm)/$SiO_2$ (70 nm).

Embodiment 5

A method for preparing a single-sided mirror includes the following operations.

A glass substrate is provided, where the glass substrate has a thickness of 3 mm, and the glass substrate is ultrasonically cleaned using ethanol, then rinsed using deionized water, and dried in a vacuum environment.

The glass substrate is placed on a workpiece turret of a sputtering machine, and a platform is vacuumized, to enable a pressure in a working chamber to be lower than 0.003 Pa.

An ion source is opened, and argon is fed, where the argon has a flow rate of 280 sccm; and ion cleaning is performed on a surface of the glass substrate, where ICP power of the ion source is 0.7 kw, a vacuum degree is 0.8 Pa, and time is 5 min.

Argon is continuously fed, oxygen starts to be fed, and a sputtering power supply of a niobium target is turned on, where power of the sputtering power supply is 8 kw; and a first niobium oxide layer is deposited on the surface of the glass substrate, where a working pressure of a coating film is 0.45 Pa, a coating time is 160 s, and the first niobium oxide layer has a thickness of 48 nm.

The niobium target is turned off, a gas source continuously supplies gas, and a sputtering power supply of a silicon target is turned on, where power of the sputtering power supply is 8 kw; and a first silicon oxide layer is deposited on a surface of the first niobium oxide layer, where a working pressure of a coating film is 0.45 Pa, a coating time is 350 s, and the first silicon oxide layer has a thickness of 105 nm.

Oxygen is turned off, and the niobium target is turned on, where power of a sputtering power supply is 5 kw; and a niobium layer deposited on a surface of the first silicon oxide layer, where a working pressure of a coating film is 0.45 Pa, a coating time is 180 s, and the niobium layer has a thickness of 18 nm.

The sputtering power supply of the niobium target is turned off, oxygen is fed, and the sputtering power supply of the niobium target is turned on, where power of the sputtering power supply is 8 kw; and a second niobium oxide layer is deposited on a surface of the niobium layer, where a working pressure of a coating film is 0.45 Pa, a coating time is 240 s, and the second niobium oxide layer has a thickness of 72 nm.

The niobium target is turned off, the gas source continuously supplies gas, the sputtering power supply of the silicon target is turned on, where the power of the sputtering power supply is 8 kw; a second silicon oxide layer is deposited on a surface of the second niobium oxide layer, where a working pressure of a coating film is 0.45 Pa, a coating time is 273 s, and the second silicon oxide layer has a thickness of 82 nm; and a unidirectional perspective film is formed, and a single-sided mirror is obtained, where a structure of the single-sided mirror is substrate/$Nb_2O_5$ (48 nm)/$SiO_2$ (105 nm)/Nb (18 nm)/$Nb_2O_5$ (72 nm)/$SiO_2$ (82 nm).

Embodiment 6

A method for preparing a single-sided mirror includes the following operations.

A glass substrate is provided, where the glass substrate has a thickness of 3 mm, and the glass substrate is ultrasonically cleaned using ethanol, then rinsed using deionized water, and dried in a vacuum environment.

The glass substrate is placed on a workpiece turret of a sputtering machine, and a platform is vacuumized, to enable a pressure in a working chamber to be lower than 0.003 Pa.

An ion source is opened, and argon is fed, where the argon has a flow rate of 280 sccm; and ion cleaning is performed on a surface of the glass substrate, where ICP power of the ion source is 0.7 kw, a vacuum degree is 0.8 Pa, and time is 5 min.

Argon is continuously fed, oxygen starts to be fed, and a sputtering power supply of a niobium target is turned on, where power of the sputtering power supply is 8 kw; and a first niobium oxide layer is deposited on the surface of the glass substrate, where a working pressure of a coating film is 0.45 Pa, a coating time is 106 s, and the first niobium oxide layer has a thickness of 32 nm.

The niobium target is turned off, a gas source continuously supplies gas, and a sputtering power supply of a silicon target is turned on, where power of the sputtering power supply is 8 kw; and a first silicon oxide layer is deposited on a surface of the first niobium oxide layer, where a working pressure of a coating film is 0.45 Pa, a coating time is 316 s, and the first silicon oxide layer has a thickness of 92 nm.

Oxygen is turned off, and a titanium target is turned on, where power of a sputtering power supply is 5 kw; and a titanium layer deposited on a surface of the first silicon oxide layer, where a working pressure of a coating film is 0.45 Pa, a coating time is 150 s, and the titanium layer has a thickness of 15 nm.

The sputtering power supply of the titanium target is turned off, oxygen is fed, and the sputtering power supply of the niobium target is turned on, where power of the sputtering power supply is 8 kw; and a second niobium oxide layer is deposited on a surface of the niobium layer, where a working pressure of a coating film is 0.45 Pa, a coating time is 233 s, and the second niobium oxide layer has a thickness of 70 nm.

The niobium target is turned off, the gas source continuously supplies gas, the sputtering power supply of the silicon target is turned on, where the power of the sputtering power supply is 8 kw; a second silicon oxide layer is deposited on a surface of the second niobium oxide layer, where a working pressure of a coating film is 0.45 Pa, a coating time is 273 s, and the second silicon oxide layer has a thickness of 85 nm; and a unidirectional perspective film is formed, and a single-sided mirror is obtained, where a structure of the single-sided mirror is substrate/$Nb_2O_5$ (32 nm)/$SiO_2$ (92 nm)/Ti (15 nm)/$Nb_2O_5$ (70 nm)/$SiO_2$ (85 nm).

Embodiment 7

A method for preparing a single-sided mirror includes the following operations.

A glass substrate is provided, where the glass substrate has a thickness of 3 mm, and the glass substrate is ultrasonically cleaned using ethanol, then rinsed using deionized water, and dried in a vacuum environment.

The glass substrate is placed on a workpiece turret of a sputtering machine, and a platform is vacuumized, to enable a pressure in a working chamber to be lower than 0.003 Pa.

An ion source is opened, and argon is fed, where the argon has a flow rate of 280 sccm; and ion cleaning is performed on a surface of the glass substrate, where ICP power of the ion source is 0.7 kw, a vacuum degree is 0.8 Pa, and time is 5 min.

Argon is continuously fed, oxygen starts to be fed, and a sputtering power supply of a niobium target is turned on, where power of the sputtering power supply is 8 kw; and a first niobium oxide layer is deposited on the surface of the glass substrate, where a working pressure of a coating film is 0.45 Pa, a coating time is 160 s, and the first niobium oxide layer has a thickness of 48 nm.

The niobium target is turned off, a gas source continuously supplies gas, and a sputtering power supply of a silicon target is turned on, where power of the sputtering power supply is 8 kw; and a first silicon oxide layer is deposited on a surface of the first niobium oxide layer, where a working pressure of a coating film is 0.45 Pa, a coating time is 350 s, and the first silicon oxide layer has a thickness of 102 nm.

Oxygen is turned off, and a chromium target is turned on, where power of a sputtering power supply is 5 kw; and a chromium layer deposited on a surface of the first silicon oxide layer, where a working pressure of a coating film is 0.45 Pa, a coating time is 100 s, and the chromium layer has a thickness of 10 nm.

The sputtering power supply of the chromium target is turned off, oxygen is fed, and a sputtering power supply of a niobium target is turned on, where power of the sputtering power supply is 8 kw; and a second niobium oxide layer is deposited on a surface of the chromium layer, where a working pressure of a coating film is 0.45 Pa, a coating time is 206 s, and the second niobium oxide layer has a thickness of 62 nm.

The niobium target is turned off, the gas source continuously supplies gas, the sputtering power supply of the silicon target is turned on, where the power of the sputtering power supply is 8 kw; a second silicon oxide layer is deposited on a surface of the second niobium oxide layer, where a working pressure of a coating film is 0.45 Pa, a coating time is 286 s, and the second silicon oxide layer has a thickness of 86 nm; and a unidirectional perspective film is formed, and a single-sided mirror is obtained, where a structure of the single-sided mirror is substrate/$Nb_2O_5$ (48 nm)/$SiO_2$ (102 nm)/Cr (10 nm)/$Nb_2O_5$ (62 nm)/$SiO_2$ (86 nm).

Embodiment 8

A method for preparing a single-sided mirror includes the following operations.

A glass substrate is provided, where the glass substrate has a thickness of 3 mm, and the glass substrate is ultrasonically cleaned using ethanol, then rinsed using deionized water, and dried in a vacuum environment.

The glass substrate is placed on a workpiece turret of a sputtering machine, and a platform is vacuumized, to enable a pressure in a working chamber to be lower than 0.003 Pa.

An ion source is opened, and argon is fed, where the argon has a flow rate of 280 sccm; and ion cleaning is performed on a surface of the glass substrate, where ICP power of the ion source is 0.7 kw, a vacuum degree is 0.8 Pa, and time is 5 min.

Argon is continuously fed, oxygen starts to be fed, and a sputtering power supply of a niobium target is turned on, where power of the sputtering power supply is 8 kw; and a first niobium oxide layer is deposited on the surface of the glass substrate, where a working pressure of a coating film is 0.45 Pa, a coating time is 231 s, and the first niobium oxide layer has a thickness of 72 nm.

The niobium target is turned off, a gas source continuously supplies gas, and a sputtering power supply of a silicon target is turned on, where power of the sputtering power supply is 8 kw; and a first silicon oxide layer is deposited on a surface of the first niobium oxide layer, where a working pressure of a coating film is 0.45 Pa, a coating time is 289 s, and the first silicon oxide layer has a thickness of 86 nm.

Oxygen is turned off, and the silicon target is turned on, where power of a sputtering power supply is 5 kw; and a silicon layer deposited on a surface of the first silicon oxide layer, where a working pressure of a coating film is 0.45 Pa, a coating time is 200 s, and the silicon layer has a thickness of 20 nm.

The sputtering power supply of the silicon target is turned off, oxygen is fed, and a sputtering power supply of a niobium target is turned on, where power of the sputtering power supply is 8 kw; and a second niobium oxide layer is deposited on a surface of the chromium layer, where a working pressure of a coating film is 0.45 Pa, a coating time is 240 s, and the second niobium oxide layer has a thickness of 72 nm.

The niobium target is turned off, the gas source continuously supplies gas, the sputtering power supply of the silicon target is turned on, where the power of the sputtering power supply is 8 kw; a second silicon oxide layer is deposited on a surface of the second niobium oxide layer, where a working pressure of a coating film is 0.45 Pa, a coating time is 273 s, and the second silicon oxide layer has a thickness of 82 nm; and a unidirectional perspective film is formed, and a single-sided mirror is obtained, where a structure of the single-sided mirror is substrate/$Nb_2O_5$ (72 nm)/$SiO_2$ (86 nm)/Si (20 nm)/$Nb_2O_5$ (72 nm)/$SiO_2$(82 nm).

Embodiment 9

A method for preparing a single-sided mirror includes the following operations.

A glass substrate is provided, where the glass substrate has a thickness of 3 mm, and the glass substrate is ultrasonically cleaned using ethanol, then rinsed using deionized water, and dried in a vacuum environment.

The glass substrate is placed on a workpiece turret of a sputtering machine, and a platform is vacuumized, to enable a pressure in a working chamber to be lower than 0.003 Pa.

An ion source is opened, and argon is fed, where the argon has a flow rate of 280 sccm; and ion cleaning is performed on a surface of the glass substrate, where ICP power of the ion source is 0.7 kw, a vacuum degree is 0.8 Pa, and time is 5 min.

Argon is continuously fed, oxygen starts to be fed, and a sputtering power supply of a niobium target is turned on, where power of the sputtering power supply is 8 kw; and a first niobium oxide layer is deposited on the surface of the glass substrate, where a working pressure of a coating film is 0.45 Pa, a coating time is 173 s, and the first niobium oxide layer has a thickness of 52 nm.

The niobium target is turned off, a gas source continuously supplies gas, and a sputtering power supply of a silicon target is turned on, where power of the sputtering power supply is 8 kw; and a first silicon oxide layer is deposited on a surface of the first niobium oxide layer, where a working pressure of a coating film is 0.45 Pa, a coating time is 310 s, and the first silicon oxide layer has a thickness of 93 nm.

Oxygen is turned off, and an indium target is turned on, where power of a sputtering power supply is 5 kw; and an indium layer deposited on a surface of the first silicon oxide layer, where a working pressure of a coating film is 0.45 Pa, a coating time is 150 s, and the indium layer has a thickness of 15 nm.

The sputtering power supply of the indium target is turned off, oxygen is fed, and a sputtering power supply of a niobium target is turned on, where power of the sputtering power supply is 8 kw; and a second niobium oxide layer is deposited on a surface of the chromium layer, where a working pressure of a coating film is 0.45 Pa, a coating time is 140 s, and the second niobium oxide layer has a thickness of 42 nm.

The niobium target is turned off, the gas source continuously supplies gas, the sputtering power supply of the silicon target is turned on, where the power of the sputtering power supply is 8 kw; a second silicon oxide layer is deposited on a surface of the second niobium oxide layer, where a working pressure of a coating film is 0.45 Pa, a coating time is 263 s, and the second silicon oxide layer has a thickness of 82 nm; and a unidirectional perspective film is formed, and a single-sided mirror is obtained, where a structure of the single-sided mirror is substrate/$Nb_2O_5$ (52 nm)/$SiO_2$ (93 nm)/In (15 nm)/$Nb_2O_5$ (42 nm)/$SiO_2$ (82 nm).

Embodiment 10

A method for preparing a single-sided mirror includes the following operations.

A glass substrate is provided, where the glass substrate has a thickness of 3 mm, and the glass substrate is ultrasonically cleaned using ethanol, then rinsed using deionized water, and dried in a vacuum environment.

The glass substrate is placed on a workpiece turret of a sputtering machine, and a platform is vacuumized, to enable a pressure in a working chamber to be lower than 0.003 Pa.

An ion source is opened, and argon is fed, where the argon has a flow rate of 280 sccm; and ion cleaning is performed on a surface of the glass substrate, where ICP power of the ion source is 0.7 kw, a vacuum degree is 0.8 Pa, and time is 5 min.

Argon is continuously fed, oxygen starts to be fed, and a sputtering power supply of a niobium target is turned on, where power of the sputtering power supply is 8 kw; and a first niobium oxide layer is deposited on the surface of the glass substrate, where a working pressure of a coating film is 0.45 Pa, a coating time is 133 s, and the first niobium oxide layer has a thickness of 25 nm.

The niobium target is turned off, a gas source continuously supplies gas, and a sputtering power supply of a silicon target is turned on, where power of the sputtering power supply is 8 kw; and a first silicon oxide layer is deposited on a surface of the first niobium oxide layer, where a working pressure of a coating film is 0.45 Pa, a coating time is 340 s, and the first silicon oxide layer has a thickness of 102 nm.

Oxygen is turned off, and a chromium target is turned on, where power of a sputtering power supply is 5 kw; and a chromium layer deposited on a surface of the first silicon oxide layer, where a working pressure of a coating film is 0.45 Pa, a coating time is 150 s, and the chromium layer has a thickness of 15 nm.

The sputtering power supply of the chromium target is turned off, oxygen is fed, and a sputtering power supply of a niobium target is turned on, where power of the sputtering power supply is 8 kw; and a second niobium oxide layer is deposited on a surface of the chromium layer, where a working pressure of a coating film is 0.45 Pa, a coating time is 240 s, and the second niobium oxide layer has a thickness of 72 nm.

The niobium target is turned off, the gas source continuously supplies gas, the sputtering power supply of the silicon target is turned on, where the power of the sputtering power supply is 8 kw; a second silicon oxide layer is deposited on a surface of the second niobium oxide layer, where a working pressure of a coating film is 0.45 Pa, a coating time is 263 s, and the second silicon oxide layer has a thickness of 82 nm; and a unidirectional perspective film is formed, and a single-sided mirror is obtained, where a structure of the single-sided mirror is substrate/$Nb_2O_5$ (25 nm)/$SiO_2$ (102 nm)/Cr (15 nm)/$Nb_2O_5$ (72 nm)/$SiO_2$ (82 nm).

Embodiment 11

A method for preparing a single-sided mirror includes the following operations.

A glass substrate is provided, where the glass substrate has a thickness of 3 mm, and the glass substrate is ultrasonically cleaned using ethanol, then rinsed using deionized water, and dried in a vacuum environment.

The glass substrate is placed on a workpiece turret of a sputtering machine, and a platform is vacuumized, to enable a pressure in a working chamber to be lower than 0.003 Pa.

An ion source is opened, and argon is fed, where the argon has a flow rate of 280 sccm; and ion cleaning is performed on a surface of the glass substrate, where ICP power of the ion source is 0.7 kw, a vacuum degree is 0.8 Pa, and time is 5 min.

Argon is continuously fed, oxygen starts to be fed, and a sputtering power supply of a niobium target is turned on, where power of the sputtering power supply is 8 kw; and a first niobium oxide layer is deposited on the surface of the glass substrate, where a working pressure of a coating film is 0.45 Pa, a coating time is 127 s, and the first niobium oxide layer has a thickness of 38 nm.

The niobium target is turned off, a gas source continuously supplies gas, and a sputtering power supply of a silicon target is turned on, where power of the sputtering power supply is 8 kw; and a first silicon oxide layer is deposited on a surface of the first niobium oxide layer, where a working pressure of a coating film is 0.45 Pa, a coating time is 326 s, and the first silicon oxide layer has a thickness of 98 nm.

Oxygen is turned off, and the niobium target is turned on, where power of a sputtering power supply is 5 kw; and a niobium layer deposited on a surface of the first silicon oxide layer, where a working pressure of a coating film is 0.45 Pa, a coating time is 180 s, and the niobium layer has a thickness of 18 nm.

The sputtering power supply of the niobium target is turned off, oxygen is fed, and the sputtering power supply of the niobium target is turned on, where power of the sputtering power supply is 8 kw; and a second niobium oxide layer is deposited on a surface of the niobium layer, where a working pressure of a coating film is 0.45 Pa, a coating time is 340 s, and the second niobium oxide layer has a thickness of 102 nm.

The niobium target is turned off, the gas source continuously supplies gas, the sputtering power supply of the silicon target is turned on, where the power of the sputtering power supply is 8 kw; a second silicon oxide layer is deposited on a surface of the second niobium oxide layer, where a working pressure of a coating film is 0.45 Pa, a coating time is 143 s, and the second silicon oxide layer has a thickness of 42 nm; and a unidirectional perspective film is formed, and a single-sided mirror is obtained, where a structure of the single-sided mirror is substrate/$Nb_2O_5$ (38 nm)/$SiO_2$ (98 nm)/Nb (18 nm)/$Nb_2O_5$ (102 nm)/$SiO_2$ (42 nm).

To highlight beneficial effects of the present disclosure, the following Comparison embodiments are set.

Comparison Embodiment 1

A difference between Comparison Embodiment 1 and Embodiment 1 is that, a condition of depositing a silicon layer in Comparison Embodiment 1 is as follows: Oxygen is turned off, and a silicon target is continuously turned on, where the power of the sputtering power supply is 8 kw; a silicon layer is deposited on a surface of a first silicon oxide layer, where a working pressure of a coating film is 0.45 Pa, a coating time is 600 s, and the silicon layer has a thickness of 68 nm; and a film layer is formed, and coated glass is obtained, where a structure of the coated glass is substrate/$Nb_2O_5$ (56 nm)/$SiO_2$ (105 nm)/Si (68 nm)/$Nb_2O_5$ (102 nm)/$SiO_2$(55 nm).

Comparison Embodiment 2

A difference between Comparison Embodiment 2 and Embodiment 1 is that, a condition of depositing a silicon layer in Comparison Embodiment 2 is as follows: Oxygen is turned off, and a silicon target is continuously turned on, where the power of the sputtering power supply is 8 kw; a silicon layer is deposited on a surface of a first silicon oxide layer, where a working pressure of a coating film is 0.45 Pa, a coating time is 60 s, and the silicon layer has a thickness of 5 nm; and a film layer is formed, and coated glass is obtained, where a structure of the coated glass is substrate/$Nb_2O_5$ (56 nm)/$SiO_2$ (105 nm)/Si (5 nm)/$Nb_2O_5$ (102 nm)/$SiO_2$ (55 nm).

Effect Embodiment

To verify performance of the single-sided mirror prepared in the present disclosure, the present disclosure further provides an effect embodiment.

(1) Reflection rates and transmission rates of the single-sided mirrors of Embodiments 1 to 11 and the coated glass of Comparison Embodiments 1 and 2 are tested through a spectrophotometer, a device used for testing is an X-rite Color I5 spectrophotometer, and parameters of a test process are: repeatability: 0.03RMS CIELab; light source: pulsed xenon lamp, calibration D65; spectral range: from 360 to 750 nm; wavelength interval: 10 nm; reflection aperture: 25 mm/10 mm/6 mm; total transmission aperture: 22 mm/10 mm/6 mm; photometric range: a reflection rate ranging from 0 to 200%; photometric resolution: 0.01%; measurement time: 2.5 s. In the test process, a side of the single-sided mirror close to the glass substrate is an $R_1$ face, and another side is an $R_2$ face.

Figure 4:
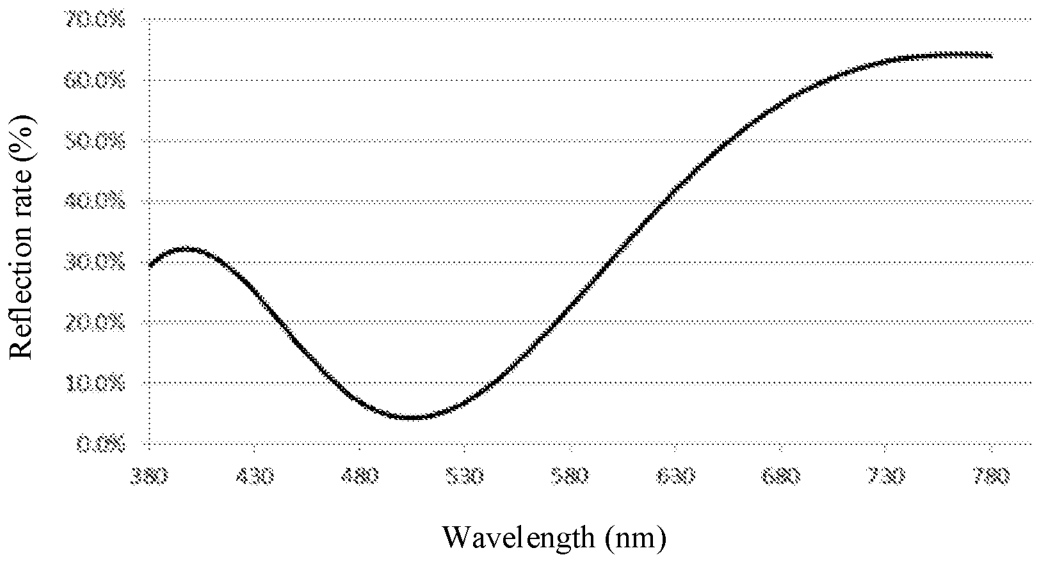
FIG. 4 is a chart of a reflection rate of an $R_1$ face of a single-sided mirror according to Embodiment 1 of the present disclosure.
Figure 5:
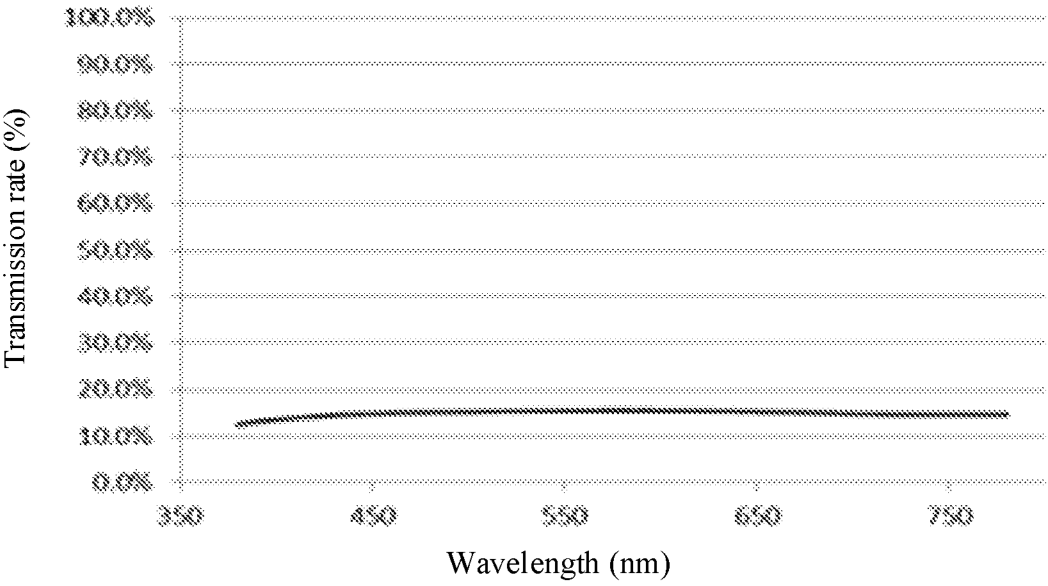
FIG. 5 is a chart of a transmission rate of an $R_1$ face of a single-sided mirror according to Embodiment 1 of the present disclosure.
Figure 6:
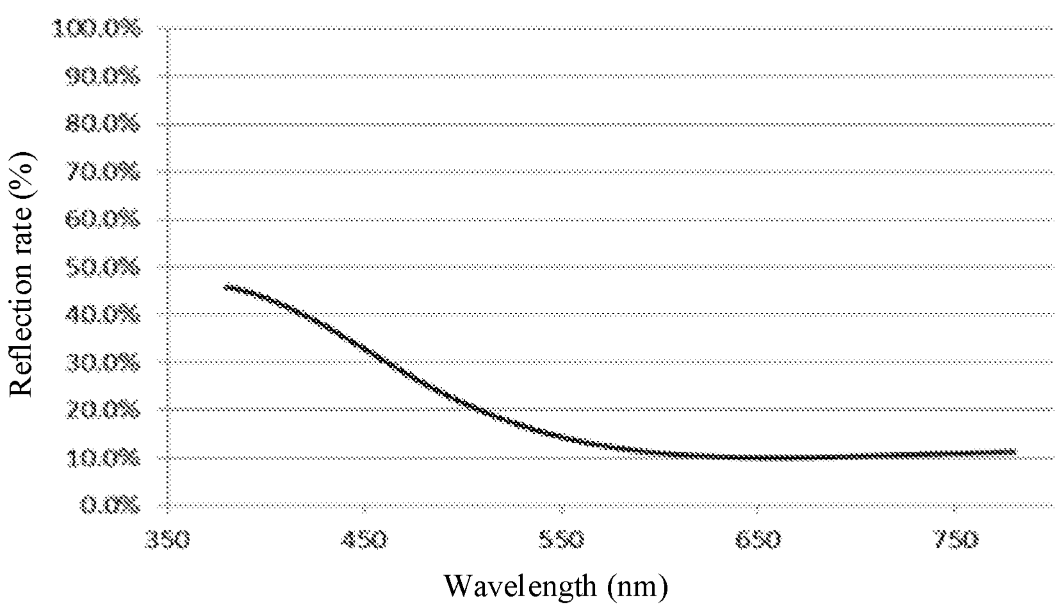
FIG. 6 is a chart of a reflection rate of an $R_2$ face of a single-sided mirror according to Embodiment 1 of the present disclosure.
Figure 7:
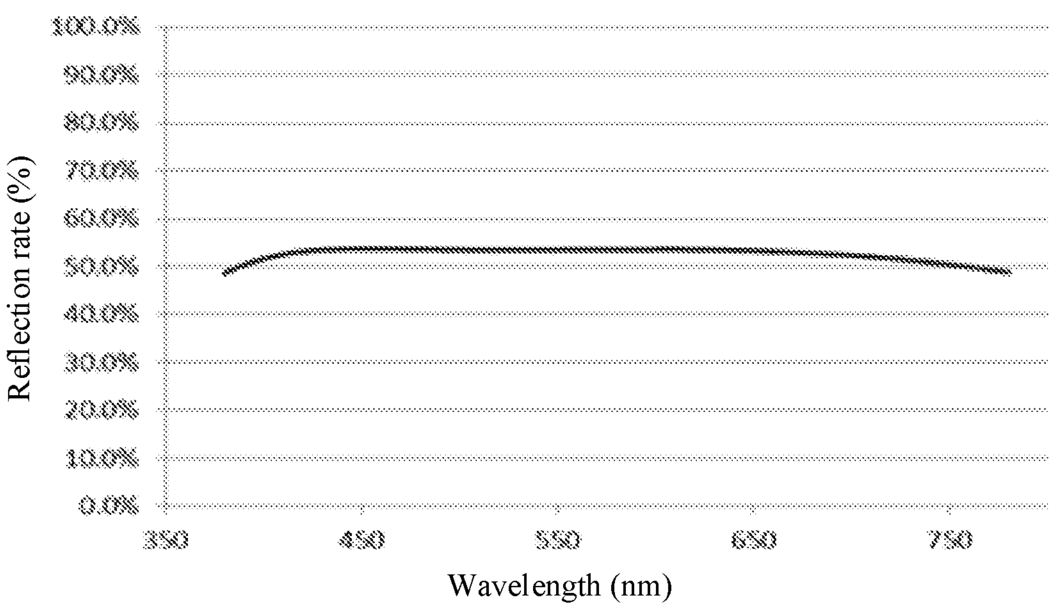
FIG. 7 is a chart of a reflection rate of an $R_1$ face of a single-sided mirror according to Embodiment 2 of the present disclosure.
Figure 8:
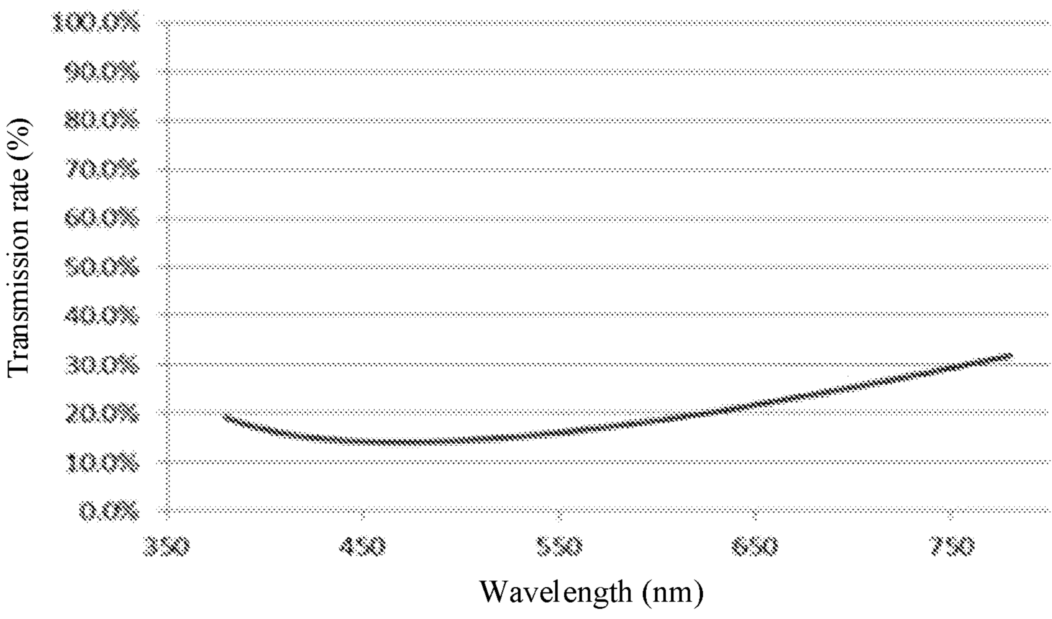
FIG. 8 is a chart of a transmission rate of an $R_1$ face of a single-sided mirror according to Embodiment 2 of the present disclosure.
Figure 9:
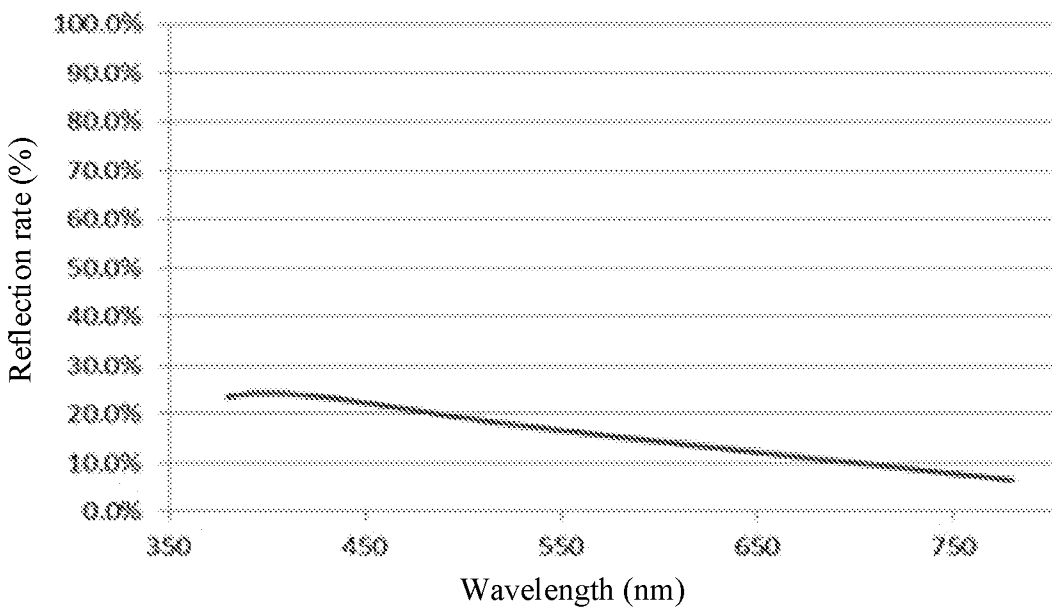
FIG. 9 is a chart of a reflection rate of an $R_2$ face of a single-sided mirror according to Embodiment 2 of the present disclosure.

Refer to FIG. 4 to FIG. 6, where FIG. 4 is a chart of a reflection rate of an $R_1$ face of a single-sided mirror according to Embodiment 1 of the present disclosure; FIG. 5 is a chart of a transmission rate of an $R_1$ face of a single-sided mirror according to Embodiment 1 of the present disclosure; FIG. 6 is a chart of a reflection rate of an $R_2$ face of a single-sided mirror according to Embodiment 1 of the present disclosure. According to test results in FIG. 4 to FIG. 6, full-waveband reflection rates or transmission rates of surfaces of the single-sided mirror are averaged, to learn that in Embodiment 1, an average reflection rate of the $R_1$ face of the single-sided mirror is 42.8%, an average reflection rate of the $R_2$ face is 21.6%, and an average transmission rate of the single-sided mirror is 15.6%. Refer to FIG. 7 to FIG. 9, where FIG. 7 is a chart of a reflection rate of an $R_1$ face of a single-sided mirror according to Embodiment 2 of the present disclosure; FIG. 8 is a chart of a transmission rate of an $R_1$ face of a single-sided mirror according to Embodiment 2 of the present disclosure; and FIG. 9 is a chart of a reflection rate of an $R_2$ face of a single-sided mirror according to Embodiment 2 of the present disclosure. According to test results in FIG. 7 to FIG. 9, full-waveband reflection rates or transmission rates of surfaces of the single-sided mirror are averaged, to learn that in Embodiment 2, an average reflection rate of the $R_1$ face of the single-sided mirror is 52.6%, an average reflection rate of the $R_2$ face is 15.6%, and an average transmission rate of the single-sided mirror is 19.9%. Reflection rates and transmission rates of the single-sided mirrors of Embodiments 1 to 11 and the coated glass of Comparison Embodiments 1 and 2 are tested using a same method. For test results of the transmission rates and the reflection rates of the single-sided mirrors of Embodiments 1 to 11 and the coated glass of Comparison Embodiments 1 and 2, refer to Table 1.

TABLE 1

Optical parameters of the single-sided mirrors of Embodiments 1 to 11 and the coated glass of Comparison Embodiments 1 and 2

| Experimental group | Reflection rate of $R_1$ face (%) | Reflection rate of $R_2$ face (%) | Transmission rate (%) |
|---|---|---|---|
| Embodiment 1 | 42.80% | 21.60% | 15.60% |
| Embodiment 2 | 52.60% | 15.60% | 19.90% |
| Embodiment 3 | 48.60% | 13.70% | 19.20% |
| Embodiment 4 | 53.50% | 13.50% | 19.50% |
| Embodiment 5 | 48.30% | 15.20% | 18.60% |
| Embodiment 6 | 52.60% | 15.20% | 19.20% |
| Embodiment 7 | 48.30% | 15.60% | 22.60% |
| Embodiment 8 | 26.30% | 15.20% | 14.80% |
| Embodiment 9 | 48.30% | 35.60% | 20.70% |
| Embodiment 10 | 20.20% | 15.20% | 18.60% |
| Embodiment 11 | 48.50% | 36.80% | 19.40% |
| Comparison Embodiment 1 | 50.20% | 19.50% | 0.32% |
| Comparison Embodiment 2 | 49.60% | 22.30% | 42.20% |

It may be learned from Table 1 that, the single-sided mirror provided in the embodiments of the present disclosure has the $R_1$ face with a high reflection rate and the $R_2$ face with a low reflection rate, and it can be ensured in collaboration with a transmission rate that the single-sided mirror has the $R_1$ face presenting a mirror face effect and the $R_2$ face presenting a perspective effect, to achieve a good single-sided perspective effect. However, in Comparison Embodiment 1, because the transmission rate of the coated glass is excessively low, neither the $R_1$ face nor the $R_2$ face of the coated glass has a perspective effect; and in Comparison Embodiment 2, because the transmission rate of the coated glass is excessively high, each of the $R_1$ face and the $R_2$ face of the coated glass has a perspective effect.

(2) Chrominances [Lab(CIE)] of the single-sided mirrors of Embodiments 1 to 11 are tested using a chrominance tester, where L represents a lightness index, A represents a red-green chromaticity index, and b represents a yellow-blue chromaticity index. Chrominance values of the single-sided mirrors of Embodiments 1 to 11 are shown in Table 2.

TABLE 2

Table of color parameters of the single-sided mirrors of Embodiments 1 to 11

| Experimental group | Chrominance value L | a | b | Color |
|---|---|---|---|---|
| Embodiment 1 | 65.3 | 22.3 | 2.5 | Skin pink |
| Embodiment 2 | 80.2 | 0.65 | 1.2 | Gray |
| Embodiment 3 | 72.3 | −21.6 | 0.56 | Green |
| Embodiment 4 | 69.3 | 0.63 | 16.2 | Golden |
| Embodiment 5 | 72.5 | 10.7 | −24.5 | Purple |
| Embodiment 6 | 36.2 | −21.5 | 0.53 | Green |
| Embodiment 7 | 32.2 | 0.23 | −18.6 | Dark blue |
| Embodiment 8 | 69.5 | 9.8 | 22.6 | Orange |
| Embodiment 9 | 72.73 | 1.23 | −12.6 | Light purple |
| Embodiment 10 | 42.3 | 24.7 | 0.3 | Brownish pink |
| Embodiment 11 | 70.7 | −16.5 | 0.53 | Bluish green |

It may be learned from Table 2 that, the unidirectional perspective film provided in the present disclosure can present different colors, achieve a diversified appearance effect, and meet a marketization requirement.

(3) Adhesions of the unidirectional perspective films in the single-sided mirrors of Embodiments 1 to 11 are tested using a cross-cut adhesion method, and a test method includes:

a. 10×10 1 mm×1 mm grids are obtained by cutting a place on the unidirectional perspective film with a surface area≥10 $mm^2$ with a cross-cut tester (whose tester blade angle ranges from 15° to 30°), and each cut line should be deepened to a bottom layer of the unidirectional perspective film.

b. Fragments in a tested area are cleaned using a hairbrush.

c. An adhesive tape with an adhesion ranging from 350 $g/cm^2$ to 400 $g/cm^2$ (adhesive paper No. 3M600 or equivalent) is used for firmly pasting small grids that are tested, and the adhesive tape is forcefully wiped using an eraser, to increase the contact area and force between the adhesive tape and the tested area.

d. An end of the adhesive tape is caught with a hand, the adhesive paper is rapidly ripped down at 90 degrees, a same test is performed twice in a same position, and a fall-off situation of the unidirectional perspective film is observed, and is graded as follows:

5B: The grids are not peeled off.

4B: The area of a part peeled off is not greater than 5% of the area of the adhesive tape in contact with the surface.

3B: The area of a part peeled off is greater than 5% of but does not exceed 15% of the area of the adhesive tape in contact with the surface.

2B: The area of a part peeled off is greater than 15% of but does not exceed 35% of the area of the adhesive tape in contact with the surface.

1B: The area of a part peeled off is greater than 35% of but does not exceed 65% of the area of the adhesive tape in contact with the surface.

0B: The area of a part peeled off is greater than 65% of the area of the adhesive tape in contact with the surface.

Adhesion test results of the single-sided mirrors of Embodiments 1 to 11 are shown in Table 3.

TABLE 3

Adhesion test results of the unidirectional perspective films of Embodiments 1 to 11

| Experimental group | Adhesion |
|---|---|
| Embodiment 1 | 5B |
| Embodiment 2 | 5B |
| Embodiment 3 | 5B |
| Embodiment 4 | 5B |
| Embodiment 5 | 5B |
| Embodiment 6 | 5B |
| Embodiment 7 | 5B |
| Embodiment 8 | 4B |
| Embodiment 9 | 5B |
| Embodiment 10 | 5B |
| Embodiment 11 | 5B |

It may be learned from Table 3 that, the unidirectional perspective film provided in the present disclosure has a high binding force for the substrate, and the film layer is not prone to fall off.

Preferred implementations of the present disclosure are described above, but cannot be construed as a limitation on the scope of the present disclosure. It should be noted that, a person of ordinary skill in the art can further make several improvements and refinements without departing from the principle of the present disclosure, and the improvements and refinements shall fall within the protection scope of the present disclosure.

What is claimed is:

1. A unidirectional perspective film, comprising a plurality of layers which comprise a first niobium oxide layer, a first silicon oxide layer, an absorption layer, a second niobium oxide layer, and a second silicon oxide layer disposed sequentially, wherein the unidirectional perspective film comprises an outer side surface and an inner side surface, the outer side surface is disposed on a surface of a substrate, one of the outer side surface and the inner side surface is a niobium oxide layer, and the other one of the outer side surface and the inner side surface is a silicon oxide layer, wherein the absorption layer has a thickness ranging from about 8 nm to about 20 nm, and a first number of layers between the surface of the substrate and a first surface of the absorption layer and a second number of layers disposed on a second surface of the absorption layer are the same, wherein the first surface of the absorption layer faces the substrate, and the second surface of the absorption layer faces away from the substrate.

2. The unidirectional perspective film according to claim 1, wherein the absorption layer comprises one or more of silicon, indium, niobium, titanium, and chromium.

3. The unidirectional perspective film according to claim 1, wherein:

each of the first niobium oxide layer and the second niobium oxide layer has a thickness ranging from about 10 nm to about 120 nm; and each of the first silicon oxide layer and the second silicon oxide layer has a thickness ranging from about 10 nm to about 160 nm.

4. The unidirectional perspective film according to claim 1, wherein:

the first niobium oxide layer has a thickness ranging from about 30 nm to about 60 nm;

the first silicon oxide layer has a thickness ranging from about 90 nm to about 110 nm;

the second niobium oxide layer has a thickness ranging from about 60 nm to about 110 nm; and the second silicon oxide layer has a thickness ranging from about 50 nm to about 90 nm.

5. The unidirectional perspective film according to claim 1, wherein a ratio of a thickness of the first niobium oxide layer to a thickness of the first silicon oxide layer is about 1:(1.5 to 3.5).

6. The unidirectional perspective film according to claim 1, wherein a ratio of a thickness of the second niobium oxide layer to a thickness of the second silicon oxide layer is about 1:(0.5 to 1.5).

7. The unidirectional perspective film according to claim 1, wherein the unidirectional perspective film has a visible light transmission rate ranging from about 10% to about 25%.

8. The unidirectional perspective film according to claim 1, wherein a first surface of the unidirectional perspective film has a first visible light reflection rate, a second surface of the unidirectional perspective film has a second visible light reflection rate, an absolute value of a difference between the first visible light reflection rate and the second visible light reflection rate is greater than or equal to 15%.

9. A single-sided mirror, comprising a substrate and an unidirectional perspective film disposed on a surface of the substrate, wherein:

the unidirectional perspective film comprises a plurality of layers which comprise a first niobium oxide layer, a first silicon oxide layer, an absorption layer, a second niobium oxide layer, and a second silicon oxide layer disposed sequentially, wherein the unidirectional perspective film comprises an outer side surface and an inner side surface, the outer side surface is disposed on a surface of a substrate, one of the outer side surface and the inner side surface is a niobium oxide layer, and the other one of the outer side surface and the inner side surface is a silicon oxide layer, wherein the absorption layer has a thickness ranging from about 8 nm to about 20 nm, and a first number of layers between the surface of the substrate and a first surface of the absorption layer and a second number of layers disposed on a second surface of the absorption layer are the same, wherein the first surface of the absorption layer faces the substrate, and the second surface of the absorption layer faces away from the substrate.

10. The single-sided mirror according to claim 9, wherein:

the absorption layer comprises one or more of silicon, indium, niobium, titanium, and chromium.

11. The single-sided mirror according to claim 9, wherein:

each of the first niobium oxide layer and the second niobium oxide layer has a thickness ranging from about 10 nm to about 120 nm; and each of the first silicon oxide layer and the second silicon oxide layer has a thickness ranging from about 10 nm to about 160 nm.

12. The single-sided mirror according to claim 9, wherein:

the first niobium oxide layer has a thickness ranging from about 30 nm to about 60 nm;

the first silicon oxide layer has a thickness ranging from about 90 nm to about 110 nm;

the second niobium oxide layer has a thickness ranging from about 60 nm to about 110 nm; and the second silicon oxide layer has a thickness ranging from about 50 nm to about 90 nm.

13. The single-sided mirror according to claim 9, wherein a ratio of a thickness of the first niobium oxide layer to a thickness of the first silicon oxide layer is about 1:(1.5 to 3.5).

14. The single-sided mirror according to claim 9, wherein a ratio of a thickness of the second niobium oxide layer to a thickness of the second silicon oxide layer is about 1:(0.5 to 1.5).

15. The single-sided mirror according to claim 9, wherein the unidirectional perspective film has a visible light transmission rate ranging from about 10% to about 25%.

16. The single-sided mirror according to claim 9, wherein a first surface of the unidirectional perspective film has a first visible light reflection rate, a second surface of the unidirectional perspective film has a second visible light reflection rate, an absolute value of a difference between the first visible light reflection rate and the second visible light reflection rate is greater than or equal to 15%.

17. An electronic device, comprising a unidirectional perspective film, wherein:

the unidirectional perspective film comprises a plurality of layers which comprise a first niobium oxide layer, a first silicon oxide layer, an absorption layer, a second niobium oxide layer, and a second silicon oxide layer disposed sequentially, wherein the unidirectional perspective film comprises an outer side surface and an inner side surface, the outer side surface is disposed on a surface of a substrate, one of the outer side surface and the inner side surface is a niobium oxide layer, and the other one of the outer side surface and the inner side surface is a silicon oxide layer, the absorption layer has a thickness ranging from about 8 nm to about 20 nm, and a first number of layers between the surface of the substrate and a first surface of the absorption layer and a second number of layers disposed on a second surface of the absorption layer are the same, wherein the first surface of the absorption layer faces the substrate, and the second surface of the absorption layer faces away from the substrate.

18. An electronic device, comprising a single-sided mirror, wherein:

the single-sided mirror comprises a substrate and the unidirectional perspective film according to claim 1 disposed on a surface of the substrate.

* * * * *